US009756611B2

(12) United States Patent
Yavuz et al.

(10) Patent No.: US 9,756,611 B2
(45) Date of Patent: Sep. 5, 2017

(54) SYSTEM AND METHOD FOR CHANNEL SELECTION TO REDUCE IMPACT TO AN EXISTING NETWORK

(71) Applicant: QUALCOMM Incorporated, San Diego, CA (US)

(72) Inventors: Mehmet Yavuz, San Diego, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 14/078,362

(22) Filed: Nov. 12, 2013

(65) Prior Publication Data

US 2015/0133057 A1    May 14, 2015

(51) Int. Cl.
*H04W 72/02* (2009.01)
*H04W 72/08* (2009.01)
*H04W 72/10* (2009.01)
*H04W 72/04* (2009.01)

(52) U.S. Cl.
CPC ......... *H04W 72/02* (2013.01); *H04W 72/082* (2013.01); *H04W 72/0453* (2013.01); *H04W 72/10* (2013.01)

(58) Field of Classification Search
CPC .................................................... H04W 72/02
See application file for complete search history.

(56) References Cited

U.S. PATENT DOCUMENTS

| 5,649,303 A * | 7/1997 | Hess et al. ............... 455/63.3 |
| 2003/0126492 A1* | 7/2003 | Cavin .................. H04L 1/0002 714/4.1 |
| 2008/0025341 A1* | 1/2008 | Rao ..................... H04W 72/048 370/468 |
| 2009/0028098 A1* | 1/2009 | Gates .................... H01Q 1/007 370/329 |
| 2012/0026941 A1 | 2/2012 | Ahmad et al. |
| 2012/0094681 A1 | 4/2012 | Freda et al. |

(Continued)

FOREIGN PATENT DOCUMENTS

| WO | 2012116489 A1 | 9/2012 |
| WO | 2013027637 A2 | 2/2013 |

OTHER PUBLICATIONS

International Search Report and Written Opinion—PCT/US2014/062727—ISA/EPO—Feb. 10, 2015.

*Primary Examiner* — Hsin-Chun Liao
(74) *Attorney, Agent, or Firm* — Arent Fox, LLP

(57) ABSTRACT

Described herein are techniques for reducing interference to non-cellular communications on an unlicensed band by a network entity sending/receiving cellular communications on the unlicensed band. For example, the technique may involve accessing a list of channels for cellular communication on the unlicensed band, the list having the channels in an order of priority for reducing interference to non-cellular communication on the unlicensed band. The technique may involve determining an interference criteria for a received signal, the interference criteria being based at in part on at least one of a received signal strength indicator (RSSI) or a duty cycle of the received signal. The technique may involve going through, in the order of priority, each channel in the list to identify a first channel that satisfies the interference criteria.

12 Claims, 6 Drawing Sheets

(56) References Cited

U.S. PATENT DOCUMENTS

2012/0163179 A1 6/2012 Jo et al.
2013/0121272 A1 5/2013 Barbieri et al.
2013/0165134 A1 6/2013 Touag et al.
2013/0195073 A1 8/2013 Chen et al.

\* cited by examiner

SYSTEM AND METHOD FOR CHANNEL SELECTION TO REDUCE IMPACT TO AN EXISTING NETWORK

BACKGROUND

Aspects of the present disclosure relate generally to wireless communication systems, and more particularly, to reducing interference to non-cellular communications on unlicensed bands.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of network entities, such as base stations, that can support communication for a number of mobile entities/devices, such as, for example, user equipment (UE) or access terminals (ATs). A mobile device may communicate with a base station via a downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between a base station, such as an evolved Node B (eNB), and a mobile device, such as a UE.

With the increased deployment of neighborhood small cells (NSCs), such as, for example, femto cells or similar small cells, there will be an increased demand for the licensed spectrum, which will likely result in spectrum shortages. Deploying NSCs on the unlicensed spectrum (e.g., 5 GHz) can unleash huge potential in meeting increased spectrum demands. It is further noted that LTE can provide higher spectral efficiency as compared to IEEE 802.11 (Wi-Fi) in the unlicensed spectrum. However, the deployment of NCSs on the unlicensed spectrum may result in interference to non-cellular communications on the unlicensed band. In this context, there remains a need for techniques to reduce interference by NSCs deployed on unlicensed bands.

SUMMARY

Illustrative aspects of the present disclosure that are shown in the drawings are summarized below. These and other aspects are more fully described in the detailed description section. It is to be understood, however, that the disclosure is not limited to the forms described in this Summary or in the detailed description.

In accordance with one or more aspects described herein, there is provided a method for interference management operable by a network entity (e.g., an NSC) or component(s) thereof. The method may involve accessing a list of channels for cellular communication (e.g., LTE) on an unlicensed band, the list having the channels in an order of priority for reducing interference to non-cellular communication (e.g., Wi-Fi) on the unlicensed band. The method may further involve determining an interference criteria for a received signal, the interference criteria being based at in part on at least one of a received signal strength indicator (RSSI) or a duty cycle of the received signal. The method may also involve going through, in the order of priority, each channel in the list to identify a first channel that satisfies the interference criteria.

In related aspects, the method may involve selecting the first channel for cellular communication in the unlicensed band to further reduce the interference to non-cellular communication in the unlicensed band. In further related aspects, the method may involve, in response to none of the channels in the list satisfying the interference criteria, identifying a second channel on which the cellular communication results in a least amount of interference to non-cellular communication on the unlicensed band. In yet further related aspects, the method may involve determining an RSSI for each channel in the list, apportioning non-cellular contribution and cellular contribution to the RSSI, and assigning higher weight to the non-cellular contribution to the RSSI. In still further related aspects, an electronic device (e.g., an NSC, a user equipment (UE) or component(s) thereof) may be configured to execute the above described methodology.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

Figure 1A:
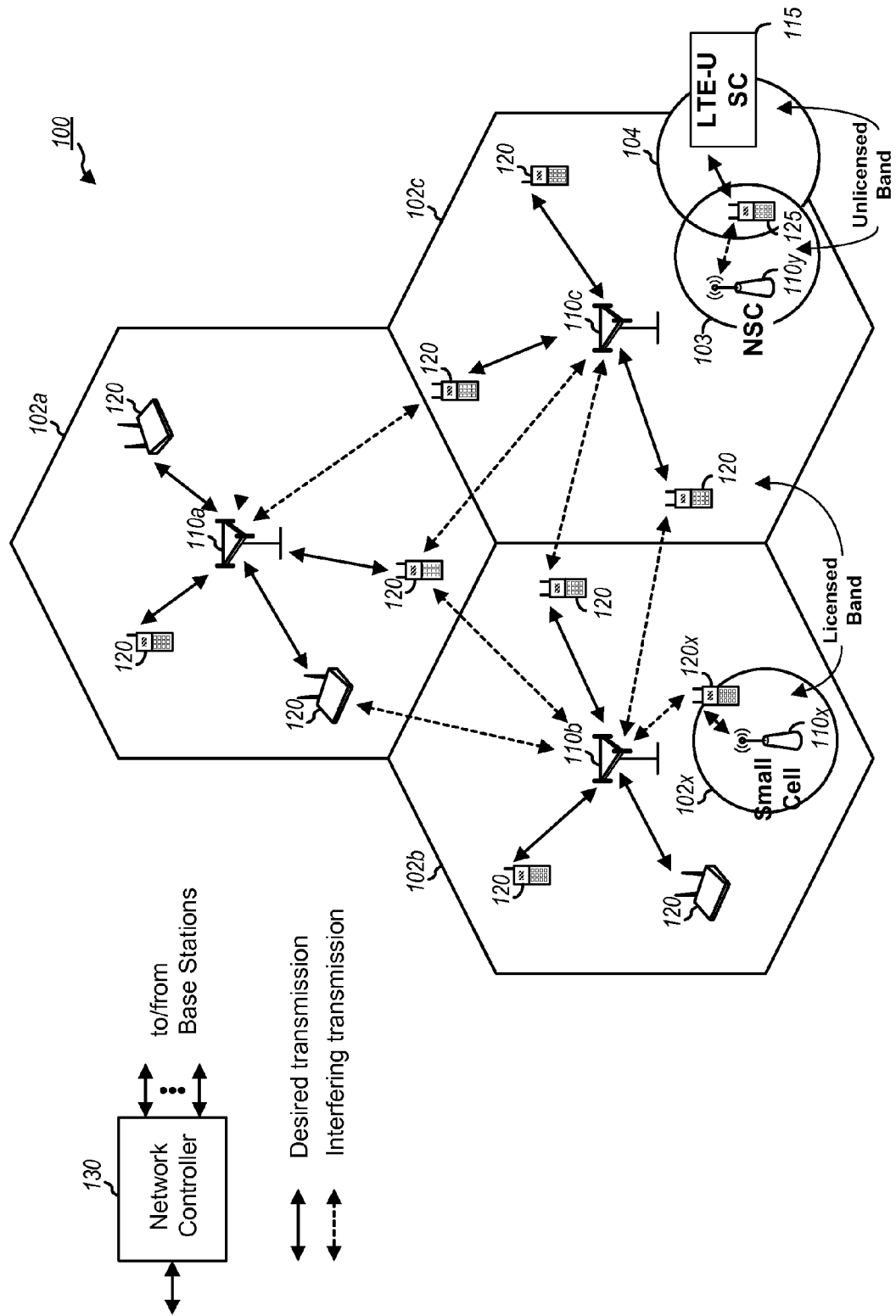
FIG. 1A is a block diagram conceptually illustrating an example of a telecommunications system.

The present disclosure relates to techniques for reducing interference to non-cellular communications (e.g., wireless local area network (WLAN) communications) on an unlicensed band by a network entity (e.g., a neighborhood small cell (NSC) sending/receiving cellular communications on the unlicensed band. In one example, the technique may relate to 3GPP Long Term Evolution (LTE) channel selection to reduce any impact to an existing Wi-Fi network or the like. It is noted that the terms NSC and small cell may be used interchangeably herein. It is further noted that the terms pico cell, and femto cell, described in further detail below, are examples of an NSC.

NSCs provide an alternative to deploying macro base stations to provide increased cellular coverage. However, a major roadblock for wide NSC deployment is the lack of available spectrum on licensed bands. Deploying NSCs on unlicensed bands holds great potential for increasing cellular coverage. It is noted that certain cellular protocols, such as LTE, provides higher spectral efficiency and coverage compared to non-cellular or WLAN protocols, such as Wi-Fi. However, the deployment of NSCs in the unlicensed bands may disrupt or cause interference to non-cellular (e.g., Wi-Fi) communications on the unlicensed bands.

It is noted that the detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

It is further noted that the techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1A shows an example wireless communication network 100, which may be an LTE network or the like. The wireless network 100 may include a number of base stations 110 (e.g., evolved Node Bs (eNBs), NSCs, etc.) and other network entities. A base station may be a station that communicates with the UEs and may also be referred to as a Node B, an access point (AP), or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG), UEs for users in the home, etc.). It is noted that a pico cell and a femto cell are examples of NSCs.

An eNB for a macro cell may be referred to as a macro eNB. An eNB for a pico cell may be referred to as a pico eNB. An eNB for a NSC may be referred to as a NSC eNB or a home eNB (HNB). In the example shown in FIG. 1, the eNBs 110a, 110b and 110c may be macro eNBs for the macro cells 102a, 102b and 102c, respectively.

The eNB 110x may be a NSC eNB for a NSC 102x, serving a UE 120x. In the present example, eNB 110x operates in licensed bands, as do the eNBs 110a, 110b and 110c. In contrast, the eNB 110y operates in an unlicensed band, and is a NSC eNB for a NSC 103, serving a UE 125 that is configured to operate in the unlicensed band. The network 100 may also include a an LTE-U (LTE operating in unlicensed band) small cell (SC) 115 that is co-located with a Wi-Fi AP radio or the like. The LTE-U SC 115 operates in the unlicensed band provides LTE_U coverage in a service area 104. The LTE-U SC 115 may provide LTE-U service for a UE 125 that is within the coverage area 104 and configured for LTE-U (i.e.,). The UE 125 may be in the in operative communication with a small cell (e.g., a femto cell or a pico cell) in an unlicensed band 103 and in the coverage area 104 simultaneously, and may be capable of both cellular and non-cellular communication in the unlicensed band.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile devices. In FIG. 1A, a solid line with double arrows indicates desired transmissions between a UE and a serving eNB, which is an eNB designated to serve the UE on the downlink and/or uplink. A dashed line with double arrows indicates interfering transmissions between a UE and an eNB.

Figure 1B:
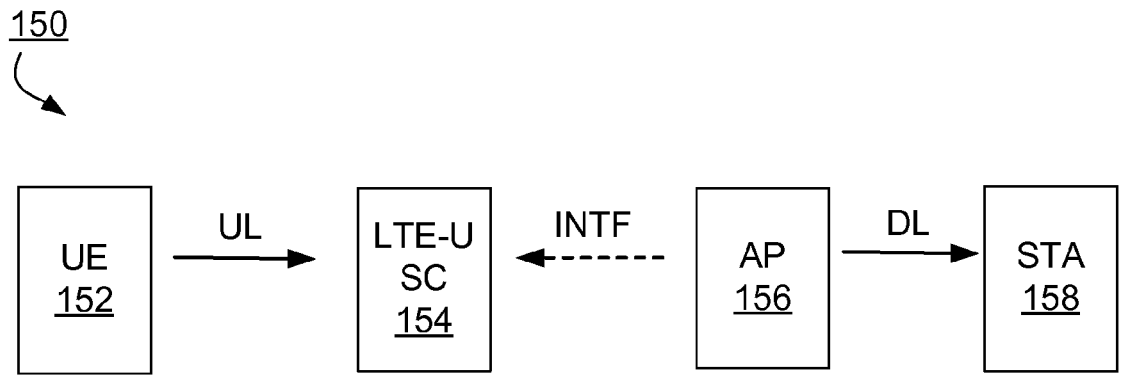
FIG. 1B illustrates a scenario in an unlicensed spectrum resulting in interference at an LTE-U (LTE operating in unlicensed band) SC (small cell).

Interference at the LTE-U SC: With reference to FIG. 1B, within an unlicensed band 150, a Wi-Fi device (e.g. AP 156 or STA 158) may be hidden from a UE 152 and may interfere with LTE-U uplink (UL) communications with a LTE-U SC 154. Such a scenario would impact PUSCH performance The PUCCH/PRACH may be sent on the PCC to avoid interference issues.

Figure 1C:
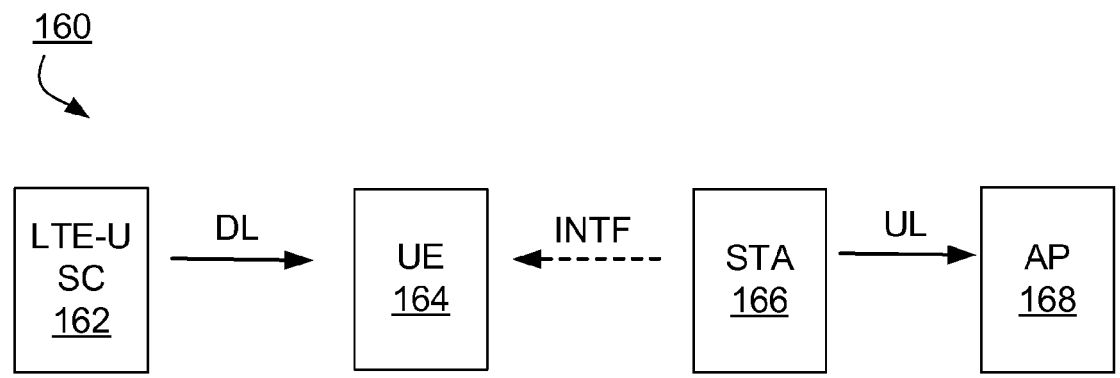
FIG. 1C illustrates a scenario in an unlicensed spectrum resulting in interference at a UE.

Interference at the UE: With reference to FIG. 1C, within an unlicensed band 160, a Wi-Fi device (e.g., AP 166 or STA 168) may be hidden from a LTE-U SC 162 and may interfere with LTE-U downlink (DL) communications with a UE 164. Such interference (INTF) to LTE-U downlink communications may impact the primary synchronization signal (PSS)/secondary synchronization signal (SSS), thereby affecting synchronization generally. Averaging can help reduce the impact to synchronization, and since is PSS/SSS is narrowband, the small cell in the unlicensed band may boost its power as needed. Interference to LTE-U downlink communications may impact PDCCH performance. Cross-carrier scheduling may be implemented to send grants on the PCC; similarly, PBCH may be sent on the PCC for robustness. Interference to Wi-Fi downlink communications may impact PDSCH performance, may impact measurements (e.g., RSRP/RSRQ can be corrupted and/or not reflect Wi-Fi interference correctly), and may result in channel quality indication (CQI) mismatch given that the cell-specific reference signal (CRS) may not capture all Wi-Fi interference.

LTE-U Channel Selection: In one approach LTE-U channel selection, a network entity (e.g., an LTE small cell in an unlicensed band or the like) may perform network listen to measure the interference level and duty cycle on different channels from both LTE and Wi-Fi networks. In one approach, this may involve taking RSSI measurements over each OFDM symbol and calculating order statistics based on the RSSI measurements. Assistance from co-located AP measurements may be specific for Wi-Fi signals (e.g., beacons, measuring RSSI from PLCP headers, etc.). Network listen may be performed periodically or triggered based on high uplink/downlink PER, IoT pattern, CQI pattern, CQI back-off, or the like. In related aspects, the PCC may configure the best available SCC(s) each trigger or channel selection period. While this approach addresses interference at the small cell in an unlicensed band, it does not address interference experienced at the UE.

In another approach to LTE-U channel selection, the network entity may utilize co-channel UE measurements and channel state information (CSI) reports. This may involve combining metrics, such as, for example, the CQI pattern, the reference signal received quality (RSRQ), and/or the rate control outer loop back-off to deduce co-channel quality and trigger channel selection. It is noted, however, that inter-frequency UE measurements such as RSRP/RSRQ may not capture Wi-Fi interference on other channels. In related aspects, the small cells in an unlicensed band may exchange information about the quality of the channels over X2 links or the like.

In yet another approach to LTE-U channel selection, the network entity may rely on interference diversity provided by using multiple SCCs, such as, for example, PCC, SCC1, SCC2, . . . , SCCk, or the like. The SCCs may be selected based on the network listen management (NLM) or the like. A given UE may be served on all available SCCs if it does not detect any Wi-Fi interference. The given UE would not be scheduled on those SCCs determined to experience Wi-Fi interference levels meeting or exceeding a given interference threshold, such as a system-defined value. For example, the determination may be based at least in part on a channel quality indicator (CQI), rate control outer loop back off, or the like. In one example, two SCCs may be sufficient for interference diversity given the low probability that a given UE would have strong Wi-Fi jammers on both channels associated with the two SCCs.

In related aspects, a given SC may schedule a narrower PDSCH to increase robustness, which may help reduce the impact from adjacent channel interference or the like. However, there are restrictive; power spectral density limits for Unlicensed National Information Infrastructure (UNIT)—low power or the like.

In yet another approach to LTE-U channel selection, the network entity may measure the Wi-Fi beacon signal strength and/or the training sequence RSSI, and de-prioritize channel selection (i.e., avoid certain Wi-Fi channels) that can cause high interference to Wi-Fi.

One approach to reducing or minimizing interference to such non-cellular communications is to implement a channel selection technique that keeps the small cells in the unlicensed band concentrated on a few channels on the unlicensed band. Still, there remains a need for an improved channel selection technique for reducing interference caused to non-cellular communications in the unlicensed band.

Such a channel selection technique may involve defining a list of channels with priority. The small cell may go through each channel in the order of priority and pick the one which satisfies an interference criteria, such as, for example, a received signal strength indicator (RSSI) being lower than a threshold. In another example, the interference criteria may be a metric that combines RSSI and duty cycle of interference, wherein the metric is below than another defined threshold. It is noted that, in one example, if the rate control loop is targeting 10% block error rate (BLER) on a first transmission, then even a jammer with a 10% duty cycle can impact the performance.

If no channels satisfy the criteria, then the small cell may pick the channel with least interference. The small cell may further distinguish between Wi-Fi contribution to the RSSI and LTE contribution to the RSSI, such as, for example, by detecting the physical layer convergence protocol (PLCP) header of Wi-Fi packets or Wi-Fi beacons. The RSSI contribution from Wi-Fi may be given higher weight than LTE (i.e., it may be preferable to select a co-channel with LTE to leverage existing interference management). A WiFi basic service set (BSS) with a service set identifier (SSID) belonging to the same operator/user can be further given higher weight to be avoided (through decoding the beacon). Neighbor small cells may exchange measurements on the channel list over X2 or the like.

Figure 2:
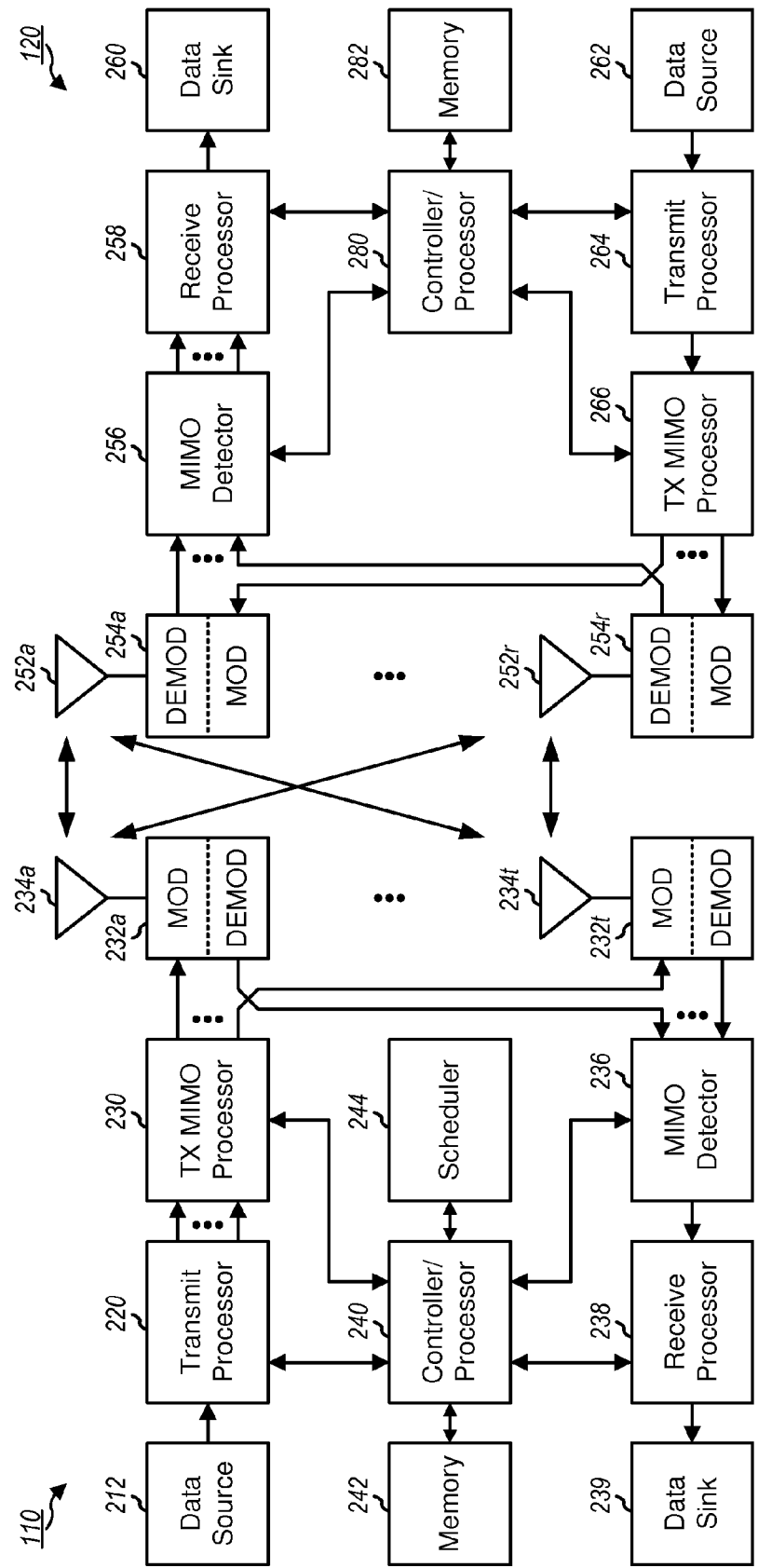
FIG. 2 is a block diagram conceptually illustrating a design of a base station and a UE configured according to one aspect of the present disclosure.

FIG. 2 shows a block diagram of a design of a base station 110 and a UE 120, which may be one of the base stations (e.g., an NSB such as 110x, 110y, or 110z) and one of the UEs, respectively, in FIG. 1. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The control information may be for the PBCH, PCFICH, PHICH, PDCCH, etc. The data may be for the PDSCH, etc. The processor 220 may process (e.g., encode and symbol map) the data and control information to obtain data symbols and control symbols, respectively. The processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 110. At the base station 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct the execution of various processes for the techniques described herein. The processor 280 and/or other processors and modules at the UE 120 may also perform or direct the execution of the functional blocks illustrated in FIGS. 6 and 7, and/or other processes for the techniques described herein. The memories 242 and 282 may store data and program codes for the base station 110 and the UE 120, respectively. A scheduler 244 may schedule UEs for data transmission on the downlink and/or uplink.

Figure 3:
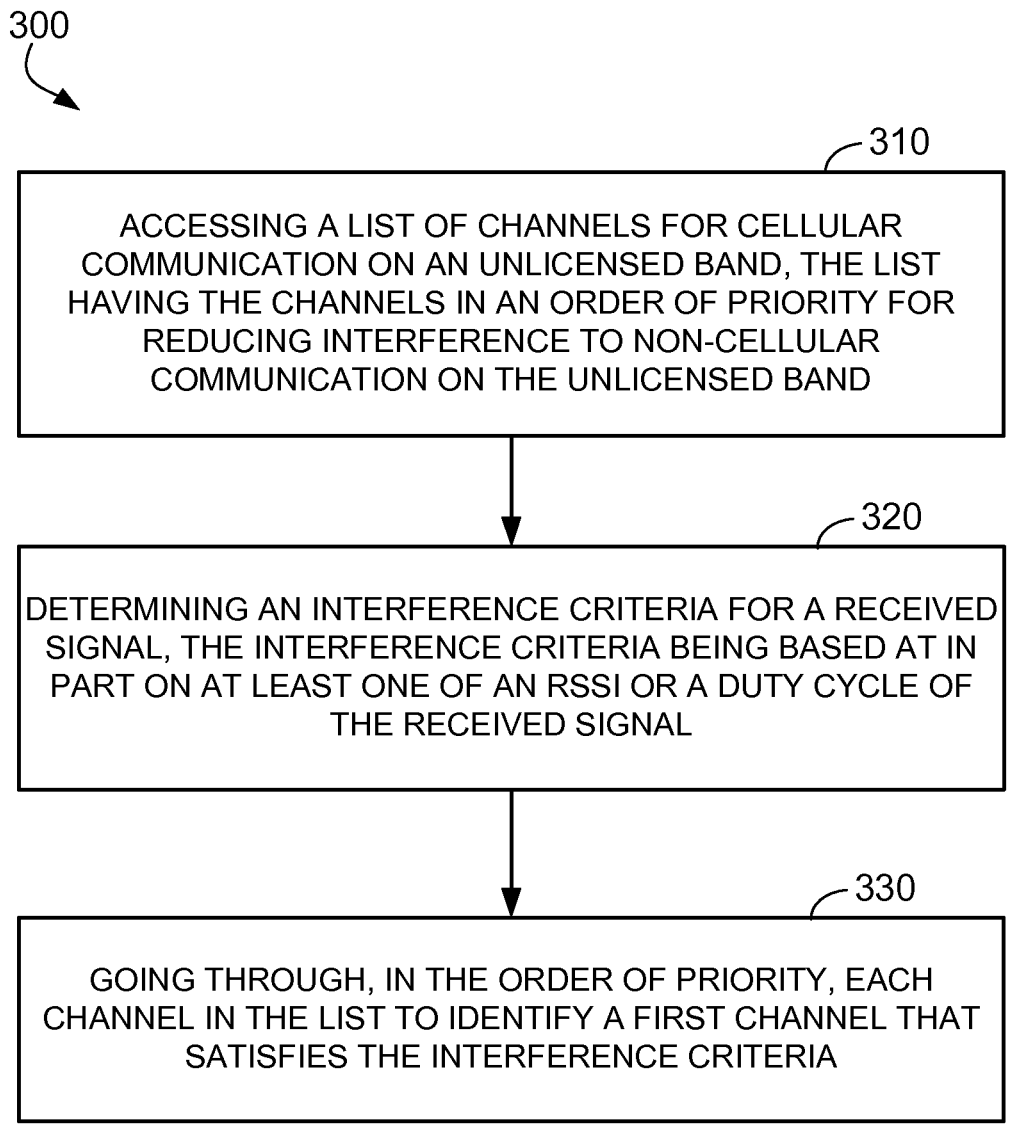
FIG. 3 illustrates an example methodology for channel selection to reduce interference to non-cellular communications on an unlicensed spectrum.
Figure 4:
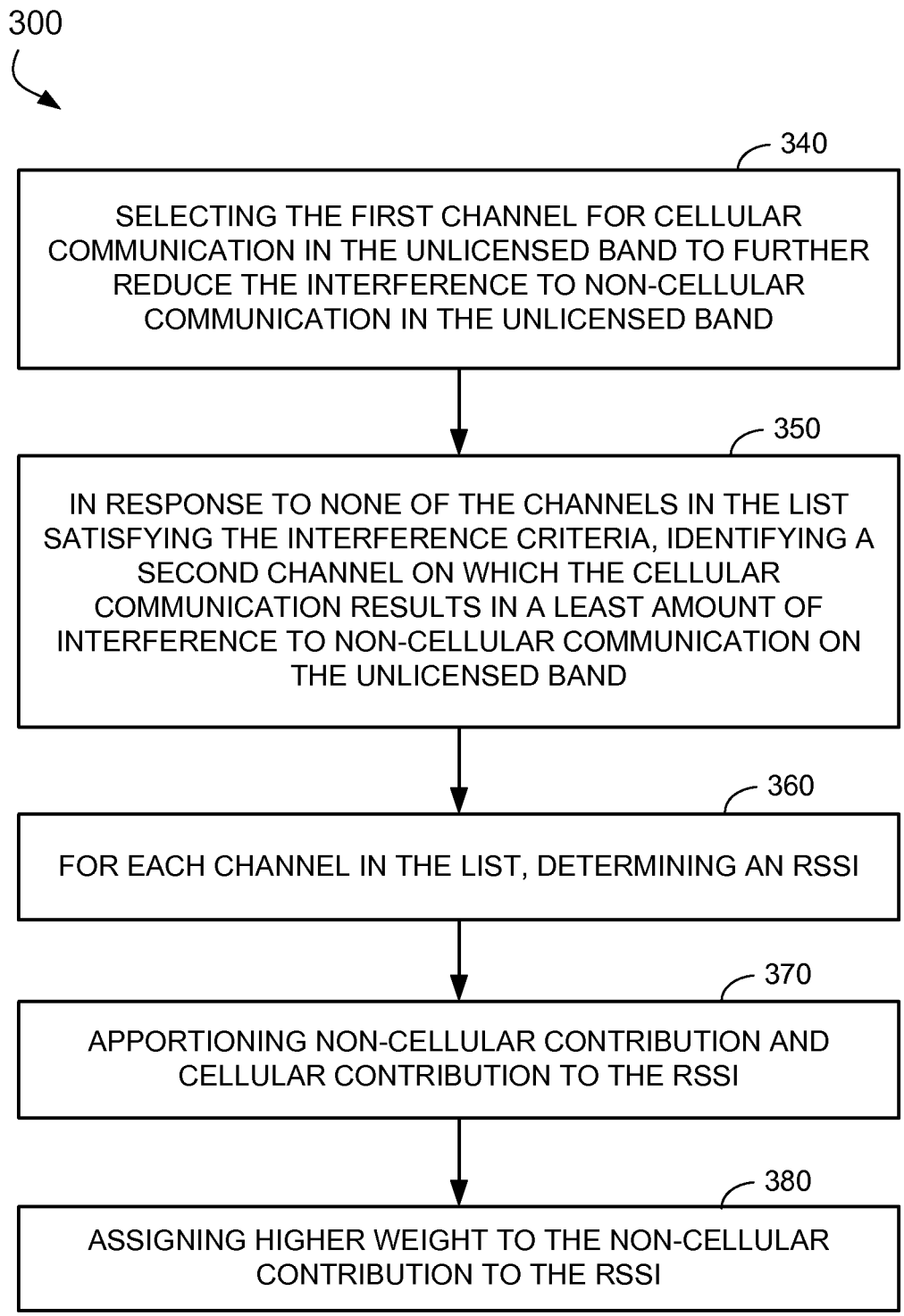
FIG. 4 illustrates further examples or aspects of methodologies for channel selection.

In one configuration, the base station 110 and/or the UE 120 may include means for performing the process illustrated in FIGS. 3-4. In one example, the aforementioned means may be the processor(s), the controller/processor 280, the memory 282, the receive processor 258, the MIMO detector 256, the demodulators 254a, and the antennas 252a configured to perform the functions recited by the aforementioned means. In another aspect, the aforementioned means may be a module or any apparatus configured to perform the functions recited by the aforementioned means.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

With reference to FIG. 3, illustrated is a methodology 300 that may be performed at a network entity, such as, for example, an small cell 110 or a UE 120 as shown in FIGS. 1-2. The method 300 may involve, at 310, accessing a list of channels for cellular communication on an unlicensed band, the list having the channels in an order of priority for reducing interference to non-cellular communication on the unlicensed band. The method 300 may involve, at 320, determining an interference criteria for a received signal, the interference criteria being based at in part on at least one of an RSSI or a duty cycle of the received signal. The method 300 may involve, at 330, going through, in the order of priority, each channel in the list to identify a first channel that satisfies the interference criteria.

With reference to FIG. 4, there are shown further operations or aspects of method 300 that are optional are not required to perform the method 300. If the method 300 includes at least one block of FIG. 4, then the method 300 may terminate after the at least one block, without necessarily having to include any subsequent downstream block(s) that may be illustrated. For example, the method 300 may further involve selecting the first channel for cellular communication in the unlicensed band to further reduce the interference to non-cellular communication in the unlicensed band (block 340).

In one example, the cellular communication comprises LTE communication on the unlicensed band, and the non-cellular communication comprises WLAN communication on the unlicensed band. In related aspects, the WLAN communication may include Wi-Fi communication on the unlicensed band.

In another example, the method 300 may involve, in response to none of the channels in the list satisfying the interference criteria, identifying a second channel on which the cellular communication results in a least amount of interference to non-cellular communication on the unlicensed band (block 350).

In related aspects, identifying the second channel (block 350) may involve: for each channel in the list, determining an RSSI (block 360); apportioning non-cellular contribution and cellular contribution to the RSSI (block 370); and assigning higher weight to the non-cellular contribution to the RSSI (block 380).

In one implementation, wherein the network entity comprises a UE or the like, one or more of blocks 310-380 may be performed by the controller/processor 280, the memory 282, the receive processor 258, and/or the transmit processor 264 of the UE 120, as shown in the example of FIG. 2. In another implementation, wherein the network entity comprises an small cell or the like, one or more of blocks 310-380 may be performed by the controller/processor 240, the memory 242, the scheduler 244, the receive processor 238, and/or the transmit processor 220 of the base station 110, as shown in the example of FIG. 2.

Figure 5:
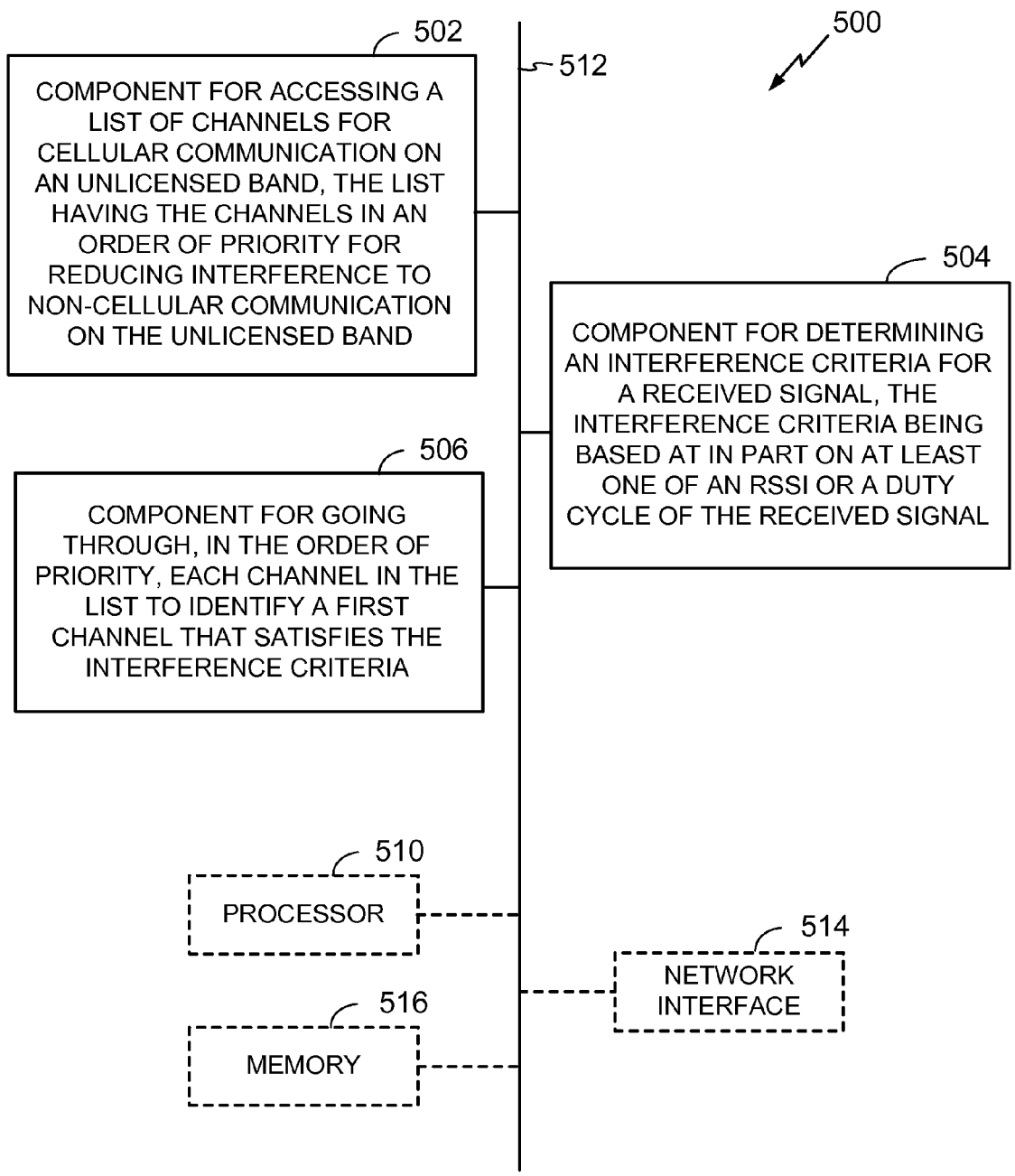
FIG. 5 shows an example apparatus for implementing the method of FIGS. 3-4.

With reference to FIG. 5, there is provided an exemplary apparatus 500 that may be configured as a UE, network entity, or other suitable entity, or as a processor, component or similar device for use within the UE, network entity, or other suitable entity, for network node selection. The apparatus 500 may include functional blocks that can represent functions implemented by a processor, software, or combination thereof (e.g., firmware).

As illustrated, in one example, the apparatus 500 may include an electrical component or module 502 for accessing a list of channels for cellular communication on an unlicensed band, the list having the channels in an order of priority for reducing interference to non-cellular communication on the unlicensed band. The apparatus 500 may include an electrical component or module 504 for determining an interference criteria for a received signal, the interference criteria being based at in part on at least one of an RSSI or a duty cycle of the received signal. The apparatus 500 may include an electrical component or module 506 for going through, in the order of priority, each channel in the list to identify a first channel that satisfies the interference criteria.

In related aspects, the apparatus 500 may optionally include a processor component 510 having at least one processor, in the case of the apparatus 500 configured as a network entity. The processor 510, in such case, may be in operative communication with the components 502-506 or similar components via a bus 512 or similar communication coupling. The processor 510 may effect initiation and scheduling of the processes or functions performed by electrical components or modules 502-506.

In further related aspects, the apparatus 500 may include a network interface component 514 for communicating with other network entities. The apparatus 500 may optionally include a component for storing information, such as, for example, a memory device/component 516. The computer readable medium or the memory component 516 may be operatively coupled to the other components of the apparatus 500 via the bus 512 or the like. The memory component 516 may be adapted to store computer readable instructions and data for performing the activity of the components 502-506, and subcomponents thereof, or the processor 510. The memory component 516 may retain instructions for executing functions associated with the components 502-506. While shown as being external to the memory 516, it is to be understood that the components 502-506 can exist within the memory 516.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method operable by a network entity configured for wireless communication, comprising:
   accessing a list of channels for cellular communication on an unlicensed band, the list having the channels in an order of priority for reducing interference to non-cellular communication on the unlicensed band;
   determining an interference criteria for a received signal, the interference criteria corresponding to a metric that combines a received signal strength indicator (RSSI) and a duty cycle of the received signal;
   selecting, based on the order of priority, a first channel from the list of channels that has not been previously selected and that has a highest priority for reducing interference to non-cellular communication on the unlicensed band; and
   determining whether the first channel satisfies the interference criteria;
   when the first channel satisfies the interference criteria, selecting the first channel for cellular communication in the unlicensed band to further reduce the interference to non-cellular communication in the unlicensed band;
   when the first channel does not satisfy the interference criteria, selecting, based on the order of priority, a second channel from the list of channels that has not been previously selected and that has the highest priority for reducing interference to non-cellular communication on the unlicensed band, the second channel selected to determine whether the second channel satisfies the interference criteria;
   in response to none of the channels in the list satisfying the interference criteria, identifying a best suited channel from the list on which the cellular communication results in a least amount of interference to non-cellular communication on the unlicensed band without going through, in the order of priority, each channel in the list again; and
   selecting the best suited channel for cellular communication in the unlicensed band to further reduce the interference to non-cellular communication in the unlicensed band.

2. The method of claim 1, wherein:
   the cellular communication comprises Long Term Evolution (LTE) communication on the unlicensed band; and
   the non-cellular communication comprises wireless local area network (WLAN) communication on the unlicensed band.

3. The method of claim 2, wherein the WLAN communication comprises 802.11 (Wi-Fi) communication on the unlicensed band.

4. The method of claim 1, wherein identifying the best suited channel further comprises:
   for each channel in the list, determining the RSSI;
   apportioning non-cellular contribution and cellular contribution to the RSSI; and
   assigning higher weight to the non-cellular contribution to the RSSI.

5. The method of claim 1, wherein the network entity comprises a mobile device or a small base station.

6. An apparatus, comprising:
   means for accessing a list of channels for cellular communication on an unlicensed band, the list having the channels in an order of priority for reducing interference to non-cellular communication on the unlicensed band;
   means for determining an interference criteria for a received signal, the interference criteria corresponding to a metric that combines a received signal strength indicator (RSSI) and a duty cycle of the received signal;
   means for selecting, based on the order of priority, a first channel from the list of channels that has not been previously selected and has a highest priority for reducing interference to non-cellular communication on the unlicensed band;
   mean for determining whether the first channel that satisfies the interference criteria;
   means for selecting the first channel for cellular communication in the unlicensed band to further reduce the interference to non-cellular communication in the unlicensed band when the first channel satisfies the interference criteria;
   means for selecting, based on the order of priority, a second channel from the list of channels that has not been previously selected and that has the highest priority for reducing interference to non-cellular communication on the unlicensed band, the second channel selected to determine whether the second channel satisfies the interference criteria when the first channel does not satisfy the interference criteria;
   means for identifying a best suited channel from the list on which the cellular communication results in a least amount of interference to non-cellular communication on the unlicensed band, in response to none of the channels in the list satisfying the interference criteria without going through, in the order of priority, each channel in the list again; and
   means for selecting the best suited channel for cellular communication in the unlicensed band to further reduce the interference to non-cellular communication in the unlicensed band.

7. The apparatus of claim 6, wherein:
   the cellular communication comprises Long Term Evolution (LTE) communication on the unlicensed band; and
   the non-cellular communication comprises wireless local area network (WLAN) communication on the unlicensed band.

8. The apparatus of claim 6, further comprising:
   means for determining the RSSI for each channel in the list;
   means for apportioning non-cellular contribution and cellular contribution to the RSSI; and
   means for assigning higher weight to the non-cellular contribution to the RSSI.

9. An apparatus, comprising:
   at least one radio frequency (RF) transceiver;
   at least one processor coupled to the at least one RF transceiver and configured to:
     access a list of channels for cellular communication on an unlicensed band, the list having the channels in an order of priority for reducing interference to non-cellular communication on the unlicensed band;
     determine an interference criteria for a received signal, the interference criteria corresponding to a metric that combines a received signal strength indicator (RSSI) and a duty cycle of the received signal;
     select, based on the order of priority, a first channel from the list of channels that has not been previously selected and that has a highest priority for reducing interference to non-cellular communication on the unlicensed band;

determine whether the first channel satisfies the interference criteria;

when the first channel satisfies the interference criteria, select the first channel for cellular communication in the unlicensed band to further reduce the interference to non-cellular communication in the unlicensed band;

when the first channel does not satisfy the interference criteria, select, based on the order of priority, a second channel from the list of channels that has not been previously selected and that has the highest priority for reducing interference to non-cellular communication on the unlicensed band, the second unselected channel selected to determine whether the second channel satisfies the interference criteria without going through, in the order of priority, each channel in the list again;

identify a best suited channel from the list on which the cellular communication results in a least amount of interference to non-cellular communication on the unlicensed band, in response to none of the channels in the list satisfying the interference criteria;

select the best suited channel for cellular communication in the unlicensed band to further reduce the interference to non-cellular communication in the unlicensed band; and a memory coupled to the at least one processor for storing data.

10. The apparatus of claim 9, wherein the at least one processor is further configured to:

determine the RSSI for each channel in the list;

apportion non-cellular contribution and cellular contribution to the RSSI; and assign higher weight to the non-cellular contribution to the RSSI.

11. A non-transitory computer-readable medium storing computer executable code for wireless communication, comprising code to:

access a list of channels for cellular communication on an unlicensed band, the list having the channels in an order of priority for reducing interference to non-cellular communication on the unlicensed band;

determine an interference criteria for a received signal, the interference criteria corresponding to a metric that combines a received signal strength indicator (RSSI) and a duty cycle of the received signal;

select, based on the order of priority, a first channel from the list of channels that has not been previously selected and that has a highest priority for reducing interference to non-cellular communication on the unlicensed band; and determine whether the first channel satisfies the interference criteria;

when the first channel satisfies the interference criteria, select the first channel for cellular communication in the unlicensed band to further reduce the interference to non-cellular communication in the unlicensed band;

when the first channel does not satisfy the interference criteria, select, based on the order of priority, a second channel from the list of channels that has not been previously selected and that has the highest priority for reducing interference to non-cellular communication on the unlicensed band, the second unselected channel selected to determine whether the second channel satisfies the interference criteria;

identify a best suited channel from the list on which the cellular communication results in a least amount of interference to non-cellular communication on the unlicensed hand, in response to none of the channels in the list satisfying the interference criteria without going through, in the order of priority, each channel in the list again; and select the best suited channel for cellular communication in the unlicensed band to further reduce the interference to non-cellular communication in the unlicensed band.

12. The non-transitory computer-readable medium of claim 11, wherein the non-transitory computer-readable medium further comprises code to:

determine the RSSI for each channel in the list;

apportion non-cellular contribution and cellular contribution to the RSSI; and assign higher weight to the non-cellular contribution to the RSSI.

* * * * *